United States Patent Office 3,449,454
Patented June 10, 1969

3,449,454
HYDROGENATION OF CONDENSED RING HETEROCYCLIC COMPOUNDS
John G. Gatsis, Des Plaines, and William K. T. Gleim, Island Lake, Ill., assignors to Universal Oil Products Company, Des Plaines, Ill., a corporation of Delaware
No Drawing. Filed June 19, 1967, Ser. No. 647,230
Int. Cl. C07c 1/00
U.S. Cl. 260—668    6 Claims

ABSTRACT OF THE DISCLOSURE

The use of a halogen hydride, selected from hydrogen chloride and hydrogen bromide, for effecting the removal of hetero atoms from, and the hydrogenation of condensed ring heterocyclic hydrocarbons—i.e., acridine is converted primarily to alkylbenzenes. Does not exert a detrimental effect with respect to mononuclear aromatics such as benzene and various alkylbenzenes which may be included in the charge stream.

APPLICABILITY OF INVENTION

The present invention relates to the catalytic hydrogenation of heterocyclic compounds, and is particularly directed to the removal of hetero atoms from condensed ring aromatic heterocyclic hydrocarbons. Heterocyclic compounds are those in which three or more atoms are joined to form a ring structure, and the ring consists of atoms of different kind. Although any atom which is capable of forming at least two covalent bonds can be a ring member, the most common, and to which our invention is unusually applicable, are sulfur, nitrogen, and oxygen. Typical of the lower-boiling heterocyclics are furfuran, thiophene, pyrrole, thiazole, pyridine, etc. Condensed ring hydrocarbons are fused ring compounds in which two or more carbon atoms are commonly shared by two or more aromatic rings. Therefore, heterocyclic condensed ring structures are those in which at least one of the "aromatic" rings contains a hetero atom. Exemplary of condensed ring heterocyclic hydrocarbons are quinoline acridine, isoquinoline, thionaphthene, coumarin, xanthene, thiochromone, benzothiazine, phenazine, etc. Other condensed ring heterocyclics, as well as additional lower-boiling heterocyclics, to which our invention is applicable, are listed in The Ring Index, Patterson et al., American Chemical Society, 2nd edition, 1960. These condensed ring heterocyclics are found as naturally-occurring compounds in petroleum crude oils, shale oils, tar sand oils, coal tar distillates, etc.

The condensed ring structure, and especially a heterocyclic, is notoriously refractory with respect to further conversion. For example, the light cycle oil from a fluid catalytic cracking process is highly refractory to further cracking and cannot, therefore, be economically recycled to extinction within the process. Furthermore, the presence of hetero atoms, sulfur, nitrogen and/or oxygen, detrimentally affects various processes to which the hetero compound-containing stream may be subjected. Through the practice of the present invention, such rings, especially condensed rings, are at least partially hydrogenated to form mononuclear aromatic hydrocarbons which can be further converted—i.e., by cracking, hydrocracking, etc.—to form lower-boiling hydrocarbons and the hetero atoms are removed to provide a contaminant-free liquid product effluent. As hereinafter indicated, with the higher order condensed ring structures such as acridine, the hydrogenated counterpart undergoes further reaction to form alkylbenzenes. Significantly, any mononuclear aromatics, benzene, toluene and isomeric xylenes in the charge stock are unaffected, and may be recovered from the effluent as a separate product stream.

PRIOR ART

While it must be acknowledged that the prior art contains examples of various schemes for effecting the catalytic hydrogenation of polynuclear condensed aromatics, and heterocyclic compounds including condensed ring heterocyclic compounds, it must likewise be noted that the hydrogenation is effected in a reaction zone containing a fixed bed of a solid hydrogenation catalyst. The hydrogenation or hydrorefining catalytic composites employed therein are generally composed of at least one metal from Groups VI and VIII of the Periodic Table and generally at least two such metals, and a refractory inorganic oxide carrier material. While such processes may have certain advantages, and be practical for effecting the simultaneous saturation of condensed ring aromatics and the removal of hetero atoms, there appears to be either no concern relative to the mononuclear aromatics and alkylbenzenes, or great pains are taken to remove the mononuclears from the charge stock beforehand. Thus, the prior art catalytic processes cause at least partial hydrogenation of the mononuclear aromatics, including alkyl-substituted compounds, with the result that these valuable hydrocarbons are lost via further conversion such as ring-opening.

To the contrary, the use of our invention to carry out the hydrogenation of heterocyclic polynuclear aromatics has no effect upon the mononuclear aromatics, and the same are thus preserved for subsequent recovery. Furthermore, the utilization of halogen hydrides causes those heterocyclic condensed ring structures of three or more rings, to undergo further reaction such that at least a portion of the hydrogenated counterpart is transformed into an alkyl-substituted mononuclear aromatic compound.

An object, therefore, of the present invention is to hydrogenate, at least partially, heterocyclic hydrocarbons. A corollary objective is to hydrogenate a heterocyclic hydrocarbonaceous charge stock which contains mononuclear aromatics and/or alkylaromatics, without affecting the aromatic nucleus of said mononuclear aromatic hydrocarbons.

Another object of out invention is to convert heterocyclic polynuclear aromatic hydrocarbons to produce hetero atom-free hydrocarbons, and, in the case of three or more fused rings, to produce alkylbenzenes.

These and other objects of out invention are attained through the utilization of an embodiment which encompasses a process for the removal of hetero atoms, selected from the group consisting of sulfur, nitrogen, oxygen and mixtures thereof, from heterocyclic compounds, which process comprises reacting said heterocyclic compound with hydrogen and in contact with a halogen hydride selected from hydrogen chloride and hydrogen bromide.

As hereinabove set forth, many heterocyclic condensed ring aromatics are found in admixture with mononuclear aromatics including benzene, toluene, xylene and alkylbenzenes. Since these aromatics have significant value, it is to great advantage to retain the mononuclears in the product effluent while producing hydrogenated, lower-boiling compounds from the condensed ring structures. Therefore, the present invention affords an improvement in a process for catalytically hydrogenating a hydrocarbon mixture containing mononuclear aromatic hydrocarbons and heterocyclic condensed nuclear aromatic hydrocarbons, the hetero atom of which is selected from the group consisting of sulfur, nitrogen, oxygen and mixtures thereof, to produce mononuclear aromatic hydrocarbons, in which process the hydrogenation of mononuclear aromatic hydrocarbons is effected, the improvement which comprises reacting said mixture with hydrogen at hydrogenating conditions and in contact with a halogen hydride selected from hydrogen chloride and hydrogen bromide, and recovering a product effluent rich in mononuclear aromatic hydrocarbons.

SUMMARY OF INVENTION

From the foregoing embodiments, it will be noted that the present invention is principally directed toward a scheme for converting condensed, or fused ring heterocyclic hydrocarbons to a form more readily susceptible to conversion by being lower-boiling, and which are substantially, completely free from sulfur, nitrogen and oxygen. In the case, for example, of quinoline, the end product is principally alkylbenzenes. With acridine, the end product is lower-boiling mononuclear aromatic hydrocarbons and alkylbenzenes. Since it is well known that the condensed ring hydrocarbons are highly refractory, and extremely difficult to convert into lower-boiling compounds, for example by subjecting the same to catalytic hydrocracking, and that this difficulty is compounded by the existence of hetero atoms, our invention affords advantages when employed as an integral part of a hydrocracking process. An unexpected advantage arising out of an unusual result, stems from the fact that the practice of the present invention does not affect the aromatic nucleus of benzene, toluene, isomeric xylenes, alkylbenzenes, or the mononuclear aromatic compounds resulting from the conversion of the condensed ring structures.

Briefly, the present invention involves contacting the heterocyclic condensed ring hydrocarbon, with a halogen hydride selected from hydrogen chloride and hydrogen bromide. Hydrogen is employed in an amount of from 3,000 to 20,000 s.c.f./bbl., and the halogen hydride in an amount of from 0.5% to about 20.0% by weight of the charge stock. Of the halogen hydrides, hydrogen bromide is particularly preferred, over hydrogen chloride, in view of the results obtained, although hydrogen chloride is operable for use with the present concept. On the other hand, hydrogen fluoride simply does not effect the desired reactions at operating conditions which are reasonably considered economically feasible, and hydrogen iodide gives rise to operational difficulties. At temperatures and pressures which foster thermal cracking reactions, it might be stated that hydrogen fluoride has too much of an effect; a large part of the charge is polymerized to solids.

Suitable hydrogenating conditions are employed, and includes temperatures above about 300° C., and preferably from 325° C. to about 550° C. Likewise, the pressure under which the reactions are effected is greater than 900 p.s.i.g. and preferably in the range of 1,000 to 5,000 p.s.i.g. An excess of hydrogen is desirable, and is admixed with the charge stock and halogen hydride in an amount of 3,000 to about 20,000 s.c.f./bbl. The halogen hydride, in an amount of from 0.5% to about 20.0% by weight of the charge, is preferably added with the hydrogen stream prior to admixture with the charge stock. The reaction zone may be provided with berl saddles, granite, porcelain, sand, or other refractory turnings to facilitate distribution of the reactants, or the zone may be supplied with mechanical devices for this purpose—i.e. perforated trays, side-to-side pans, etc.

EXAMPLES

The hydrogenation of Decalin, Tetralin, quinoline, and acridine was studied. Decalin and Tetralin are the du Pont Company's trademarks for decahydronaphthalene and 1,2,3,4-tetrahydronaphthalene, respectively. In each operation, hydrogen bromide was added to the amount of the charge stock stated below. The charge and hydrogen bromide were placed in an 1,800 cc. capacity rocker-type autoclave, pressured to about 100 atmospheres with hydrogen, and raised to a temperature of 400° C., the final pressure being about 215 atmospheres. These conditions were maintained for four (4) hours at the end of which period the autoclave was depressured and cooled, and the liquid product analyzed by infra-red, gas-liquid chromatography.

With 100.0 grams of Decalin and HBr in an amount of 10.0 grams, the liquid product analyzed 72.2% t-Decalin, 21.1% and 2.3% Tetralin, with 0.4% by weight being recovered in substantially equal quantities at 85° C., 102° C., 155° C. and 168° C. Utilizing 100 grams of Tetralin as the charge stock, with the 10 grams of hydrogen bromide, the effluent was found to contain 92.6% Tetralin and 1.1% Decalin. Of the remainder, 4.0% was recovered at a temperature of 179° C., and 2.3% at lower-boiling points indicative of alkylbenzenes—i.e., 0.5% at 98° C. and 0.4% at 176° C. This data indicates that the halogen hydride has substantially no effect on the Tetralin and Decalin.

Utilizing 20.0 grams of hydrogen bromide in admixture with 100.0 grams of Decalin, as a diluent, and 25.0 grams of quinoline, at 400° C., the final pressure was 215 atmospheres which pressure decreased 12.0 atmospheres after the four-hour period. Gas-liquid chromatographic analysis indicated the product effluent distribution shown in Table I. The normally liquid stream further analyzed as virtually nitrogen-free.

Table I

| Boiling point, ° C.: | Wt. percent |
| --- | --- |
| 68.7–102 | 1.1 |
| 115–127 | 1.1 |
| 132–155 | 1.2 |
| 159–175 | 1.6 |
| Naphthalene (218) | 0.5 |
| 236 | 0.1 |
| 237 (quinoline) | |
| 244–316 | 0.9 |
| 316 plus | |
| t-Decalin | 58.5 |
| c-Decalin | 32.3 |
| Tetralin | 2.3 |

It will be noted that there has been complete conversion of the quinoline, being reduced to lower boiling hydrocarbons. With respect to the 244° C.–316° C. portion, it is believed that these heavier components were impurities introduced with the charge stock.

Similarly, 25.0 grams of acridine were admixed with 100.0 grams of Decalin, and placed in the autoclave with 10.0 grams of hydrogen bromide. The contents were pressured to 100.0 atmospheres with hydrogen and heated to 400° C., the final pressure being 216 atmospheres. After the four-hour period, the pressure had dropped 13 atmospheres. The gas-liquid chromatographic analysis showed the nitrogen-free product distribution indicated in Table II:

Table II

| Boiling point, ° C.: | Weight percent |
| --- | --- |
| 68.7 | 0.9 |
| 72 | 0.7 |
| 85 | 0.7 |
| 98 | 1.7 |
| 119.5–127 | 0.4 |
| 236–239 | 0.9 |
| 254 | 0.5 |
| 262–281 | 0.6 |
| 305 | 0.6 |
| 305 plus | |
| t-Decalin | 41.0 |
| c-Decalin | 45.2 |
| Tetralin | 2.2 |
| Naphthalene | Trace |

It is noteworthy that all the acridine was converted into lower-boiling hydrocarbons.

The foregoing specification and the examples clearly indicate the benefits afforded through the use of the present invention for effecting the hydrogenation of heterocycles, and particularly those having a condensed ring structure.

We claim as our invention:

1. A process for the removal of hetero atoms, selected from the group consisting of sulfur, nitrogen, oxygen, and mixtures thereof, from heterocyclic compounds which comprises reacting said heterocyclic compound with hydrogen and in contact with a halogen hydride selected from hydrogen chloride and hydrogen bromide.

2. The process of claim 1 further characterized in that said halogen hydride is hydrogen chloride.

3. The process of claim 1 further characterized in that said halogen hydride is hydrogen bromide.

4. The process of claim 1 further characterized in that said halogen hydride is in an amount of from 0.5% to about 20.0% by weight.

5. A process for producing mononuclear aromatic hydrocarbons which comprises reacting polynuclear heterocyclic compounds, the hetero atom of which is selected from the group consisting of sulfur, nitrogen, oxygen and mixtures thereof, with hydrogen at hydrogenating conditions and in contact with a halogen hydride selected from hydrogen chloride and hydrogen bromide.

6. The process of claim 5 further characterized in that said hydrogenating conditions include a pressure above about 900 p.s.i.g., a temperature above about 300° C. and hydrogen in an amount greater than 3,000 s.c.f./bbl.

References Cited

UNITED STATES PATENTS

| 3,023,217 | 2/1962 | Stein et al. | 260—287 X |
| 3,209,008 | 9/1965 | Poziomek et al. | 260—288 X |

DELBERT E. GANTZ, *Primary Examiner.*

C. R. DAVIS, *Assistant Examiner.*

U.S. Cl. X.R.

260—286, 279, 667